United States Patent [19]

Strum et al.

[11] Patent Number: 4,824,618

[45] Date of Patent: Apr. 25, 1989

[54] COEXTRUSION BLOWMOLDING PROCESS

[75] Inventors: William L. Strum, Kennett Square, Pa.; Alvin S. Topolski, Wilmington, Del.

[73] Assignee: E. I. Du Pont de Nemours and Company, Wilmington, Del.

[21] Appl. No.: 135,450

[22] Filed: Dec. 21, 1987

[51] Int. Cl.⁴ .................... B29C 49/04; B29C 49/22; B29C 47/06

[52] U.S. Cl. .................... 264/37; 264/40.7; 264/173; 264/515; 425/132

[58] Field of Search ............ 264/514, 515, 536, 540, 264/541, 37, 40.7, 173; 425/132

[56] References Cited

U.S. PATENT DOCUMENTS

| | | | |
|---|---|---|---|
| 3,461,197 | 8/1969 | Lemelson | 425/132 |
| 4,040,233 | 8/1977 | Valyi | 264/537 |
| 4,056,344 | 11/1977 | Lemelson | 425/132 |
| 4,276,250 | 6/1981 | Satchell et al. | 425/132 |
| 4,510,115 | 4/1985 | Gokcen et al. | 264/515 |
| 4,522,775 | 6/1985 | Briggs et al. | 264/515 |

*Primary Examiner*—Jan H. Silbaugh
*Assistant Examiner*—Neil M. McCarthy

[57] ABSTRACT

A process for coextrusion blowmolding of multilayer polymer articles, wherein a multilayer parison is extruded through a die, introduced into a mold, and blow-molded, the flow of multilayer plastic material being periodically interrupted, and additional plastic material being injected into the extrusion die at timed intervals, so that this additional material forms portion of the parison which later are trimmed from the molded article and reprocessed for reuse.

11 Claims, 3 Drawing Sheets

COEXTRUSION BLOWMOLDING PROCESS

BACKGROUND OF THE INVENTION

This invention relates to an improved process for forming multilayer articles, such as, for example, tubes or parisons or other preforms and then blowmolding them into bottles or similar articles.

Plastic bottles and other containers are gaining increased acceptance in the packaging of such diverse articles as, for example, beverages, household articles, and motor oils. In certain applications, such bottles must satisfy a number of strict requirements, including sufficient rigidity and strength, sufficient barrier properties to prevent significant entry of oxygen or significant evaporation or leakage of liquids contained therein, and acceptable chemical composition of the innermost layer to assure absence of toxic components or contaminants when used in contact with food products.

Because of those requirements, commercial plastic containers such as bottles often are rather complex articles having multilayer walls, each layer being designed to supply the desired properties. Thus, there is at least one layer of plastic material which provides strength and/or rigidity and is generally referred to in the industry as the structural polymer layer. This may be, for example, polypropylene, polyethylene, polycarbonate, poly(ethylene terephthalate), polyamide, polystyrene, or polyvinyl chloride. It usually will be either the innermost or the outermost layer, or both. The barrier material usually will be one of the intermediate layers and normally will be laminated to its neighboring layers by means of adhesive layers. The barrier material frequently will be a polyamide, polyvinylidene chloride, or ethylene/vinyl alcohol copolymer. The adhesive layers may be, e.g, an ethylene/vinyl acetate copolymer, a low or high density polyethylene composition containing an ethylene/vinyl acetate and other copolymers, or a polypropylene composition containing a maleic anhydride component. At least one of the layers often is made totally of reground polymer or blended with virgin structural resin, the reground material being recovered by trimming the parison in the process of blowmolding articles therefrom. This helps reduce waste and lower the manufacturing cost. However, use of this reground material, which contains both the inexpensive structural polymer and the expensive barrier and adhesive resins, still does not solve the cost reduction problem in the most efficient manner. It would be desirable to be able to adjust the parison composition in such a manner that the material separating the segments from which individual blowmolded articles such as bottles or other containers are made consists to the extent possible only of the inexpensive structural polymer, so that substantially no barrier resin or bonding resin is removed with the parison trim.

An extruding apparatus for producing tubing having different physical or chemical characteristics along its axial length is known from U.S. Pat. No. 3,724,985 to Burlis et al. It comprises two or more devices feeding different molten plastic materials which devices are controlled such that when one is delivering material to the die producing the first section of the tubing, another one either is not delivering or is exhausting to an accumulator, the respective on and off cycles being controlled by an adjustable valve. In this way, each device reinjects from time to time into the die material previously withdrawn from the apparatus.

Japanese Laid Open Patent Application (Kokai) No. 53/120773 discloses a multilayer molding process, applicable especially to the extrusion of articles having layers of different colors, wherein different resins are introduced into a multilayer extrusion molding head and are extruded either simultaneously or intermittently, the flow of each resin being separately controlled by means of a valve.

SUMMARY OF THE INVENTION

According to the present invention, there is provided in the process for coextrusion blowmolding of articles, wherein molten polymer from several sources such as, e.g. extruders is fed to a multilayer coextrusion head having at least two polymer inlet ports for the feed of molten polymers, those inlet ports individually communicating with at least two corresponding coaxial channels arranged in such a manner that molten polymer flowing along the first channel at some point downstream encounters molten polymer flowing along the second channel, both polymers continuing to flow as distinct coaxial layers, the same sequence of events being repeated until all the polymers flow in the same direction as distinct coaxial layers, the final layered polymer mass being extruded through a die attached to the exit portion of the coextrusion head into a parison, which is allowed to enter a mold for the desired article placed in the path of the parison and to extend beyond the far end of said mold; closing the mold and sealing at least one end of the parison; introducing into the parison an air-blowing device and insuring that the parison is tightly sealed from the outside air; blowing air into the parison to form the desired article in the mold; cooling the formed article in the mold; opening the mold to eject the formed article and removing the end portions of the parison attached to the article originally extending beyond the mold cavity; and reprocessing and reintroducing the removed portions of the parison into the multilayer coextrusion head, the improvement of periodically interrupting the flow of multilayer plastic material and rapidly injecting into the die attached to the multilayer coextrusion head additional molten plastic material at timed intervals such that this additional material forms those sections of the parison which will later be removed from the molded article and reprocessed for reuse.

DETAILED DESCRIPTION OF THE INVENTION

Figure 1:
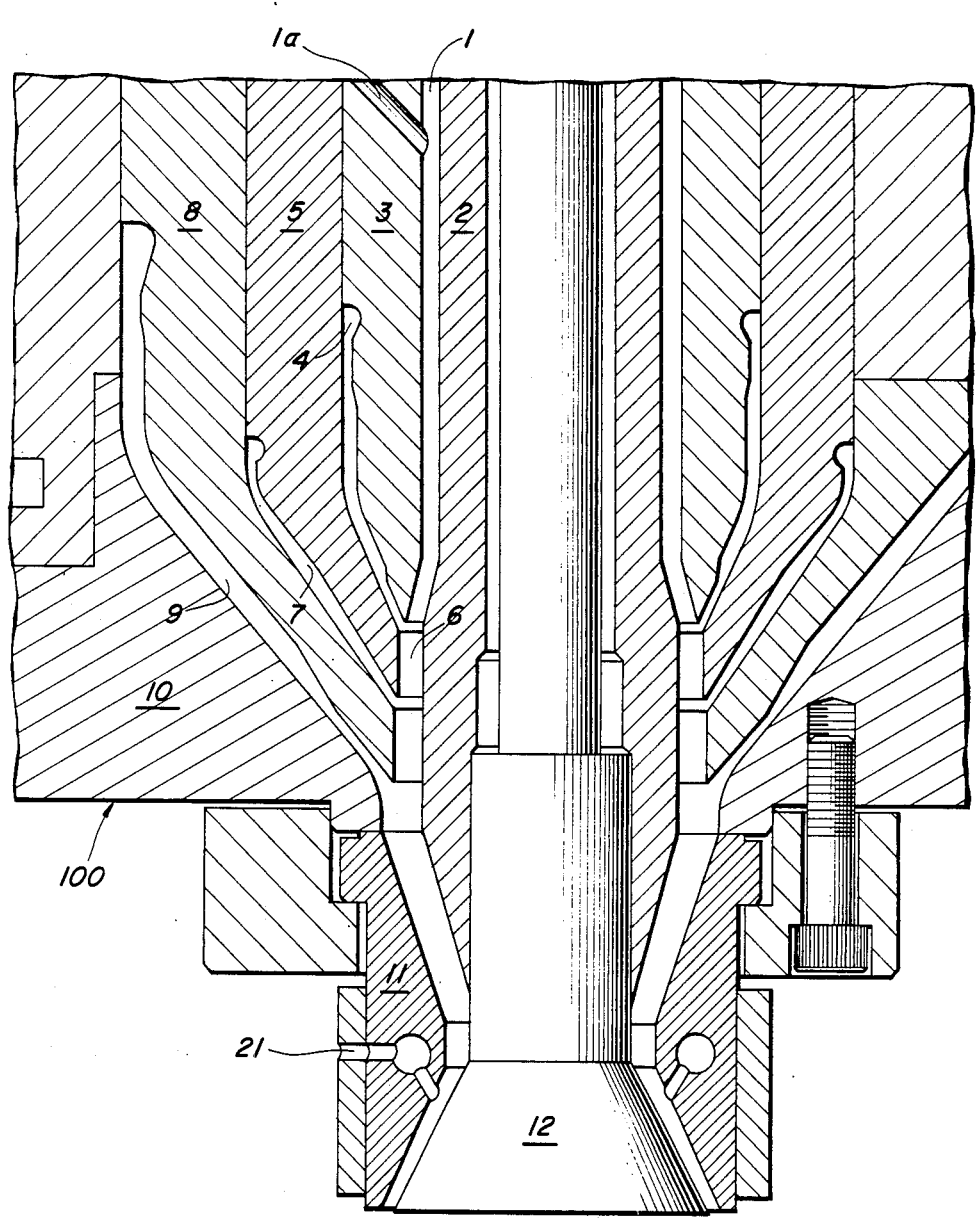
FIG. 1 represents a cross-section of a multilayer coextrusion head suitable in the process of the invention.

With reference to the drawings, a suitable multilayer coextrusion head 100 is represented in a cross-sectional view in FIG. 1. This particular coextrusion head can produce a five-layer parison, but this is not regarded as a limitation of the invention, which is applicable to any simple, extrudable, multilayer structures. A die 11 having a tapered annular opening is affixed to the exit end of the extrusion head 100. An adjustable pin 12 having a tapered end portion of a different slope than that of the die opening, is mounted axially inside the extrusion head 100 and die 11. By axially displacing pin 12, the width of the die opening and thus the wall thickness of the extrudate can be adjusted. The first molten resin is introduced into channel 1 and flows down this channel until it encounters another molten resin mass flowing along a coaxial channel 1A. From that point on, both polymer layers flow coaxially down channel 1, between members 2 and 3, until they encounter a molten resin flowing down channel 4, formed between members 3 and 5. The resulting three-layer coaxial polymer mass continues flowing down channel 6, formed between members 5 and 2, until it encounters yet another molten resin exiting channel 7, formed between members 8 and 5. A four-layer resin melt is then formed between members 8 and 2 as the polymer mass proceeds down the channel. A fifth layer of molten polymer is added as the material encounters the polymer melt flowing out of channel 9 formed between members 8 and 10. This five-layer polymer melt continues flowing between member 2 and die 11 until member 2 terminates against pin 12. The molten five-layer material flows out between die 11 and pin 12 and is extruded into a tube 13, known as the parison.

In a typical five-layer structure, the outer and inner layers are made of the structural polymer; the center (core) layer is made of a barrier resin; and the intermediate layers lying on each side of the core layer are made of an adhesive resin.

In conventional blowmolding, the parison is allowed to proceed, usually but not necessarily downwardly, between the halves of an open mold for the desired article, until it is long enough to extend beyond the far end of the mold. The mold quickly closes about the parison, which is severed by a cutting mechanism. Normally, the bottom part of the parison extends about 2.5 to 5 cm beyond the end portion of the article, depending on the article size. In this way, suitable back pressure can develop when that extra material is squeezed during mold closure to form a bottom closure or pinch-off. The mold then moves to the blowing position, where a blow pin enters the open top end of the parison and tightly seals its top opening.

In an alternative embodiment, the blowmolding step may be carried out in a mold which closes with sealing both the top and the bottom ends of the parison. A blow needle is then inserted into the parison by piercing it in the designated section thereof. Following the blowmolding step, the needle is removed, and the dome formed in the needle area is removed and recycled.

Figures 2, 5:
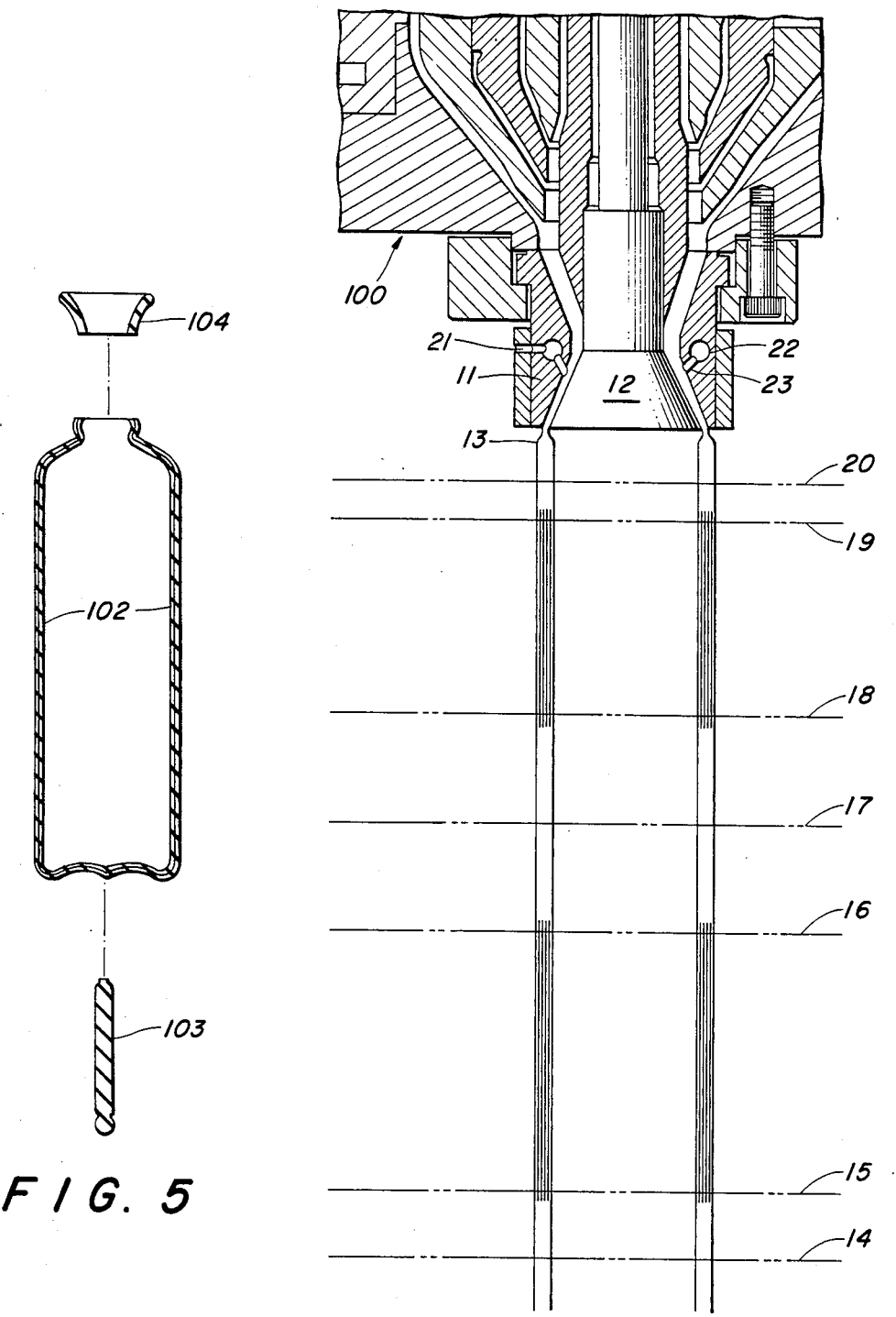
FIG. 2 is a schematic cross-sectional view of the multilayer extrusion head extruding a parison, wherein parison segments corresponding to the individual blowmolded articles are shown.
FIG. 5 is a cross-sectional view of a blow-molded article with the end portions of the parison removed.

FIG. 2 is a schematic diagram of the extrusion step in the process of the present invention, wherein 100 is a cross-section of the multilayer coextrusion head of FIG. 1 with a continuous, unmolded, unsealed parison 13 emerging from the die 11. The parison normally will not be allowed to extend to this length but will be captured by the mold as soon as it is long enough for one blow-molded article. However, to better explain the process of the invention, FIG. 2 illustrates a situation not normally encountered in this process, where two parison sections to be blowmolded into articles are shown, the first section extending from line 14 to line 17 and the second from line 17 to line 20. Line 17 is the plane where the two lengths of parison which will be used to form each one of the two containers are cut and separated. The portions of the parison from line 15 to line 16 and from line 18 to line 19 are multilayer wall sections, which will be the walls of the finished articles. The portions from line 14 to line 15 and from line 17 to line 18 will form the bottom trim or flash (103 in FIGS. 3–5). As represented in the drawing, these consist of only one layer, which is the inexpensive structural polymer. However, they can be monolayer or multilayer, depending on the container needs. The parison portions from line 16 to line 17 and from line 19 to line 20 are surplussage (104 in FIGS. 3–5) which will be trimmed away after molding and, as represented in the drawing, are entirely or nearly entirely monolayer structures. Line 15 is the plane which is sealed together for the bottom of the bottom container, and line 18 is the corresponding plane for the top container. Line 16 is the plane which is trimmed as the uppermost portion or neck opening of the bottom container, and line 19 is the corresponding plane for the top container. The section of the parison between lines 16 and 18 will be removed, reground or otherwise reprocessed, and returned to the process as completely or nearly completely monolayer structural material.

As seen in FIG. 1 and in FIG. 2, there is provided in the extrusion die 11, port 21 through which one can rapidly inject additional amounts of the inexpensive structural polymer using a high flow machine such as, for example, an injection molding machine or the like, to form at equal or higher pressures sections of parison 13 between the multilayer coextruded sections. This additional polymer flows around the circular outer channel 22 and then proceeds down channel 23 into the channel between die 11 and pin 12, where it flows out against the lowest resistance to atmosphere and forms a length of parison 13, while at the same time back-pressuring the coextrusion die head 100 and briefly interrupting that flow. Thus, timing the injection of the additional polymer through port 21 as well as the cutoff action of the blowmolding apparatus and the closing action of the mold on parison 13 makes it possible to obtain articles with multilayer coextruded sides throughout the article and only a minimum amount of the expensive barrier and bonding materials reprocessed with the structural material regrind.

Figure 3A:
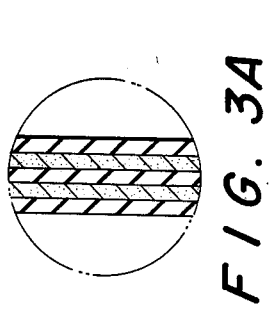
FIG. 3A is a cross-section of a wall of the blowmolded article, showing the individual polymer layers.
Figure 3:
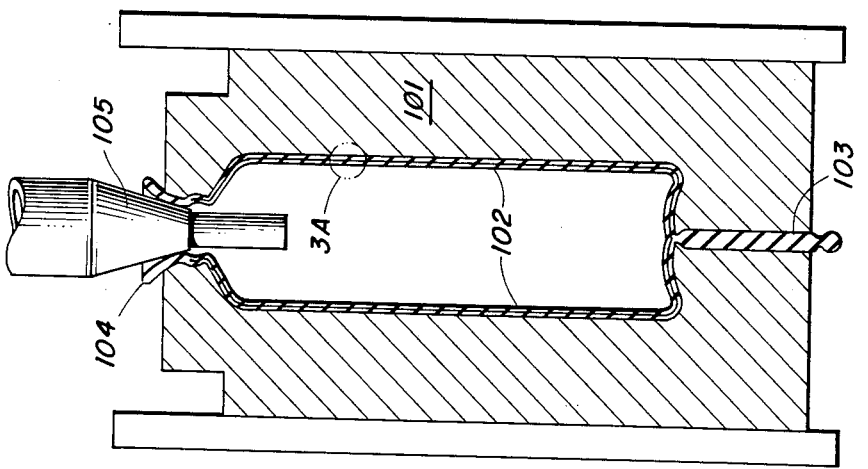
FIG. 3 is a cross-sectional view of a blowmolded article still confined in the mold in which it was formed, and prior to the removal of the end portions of the parison.

FIG. 3 shows in a cross-section a closed mold 101 containing a blowmolded article 102. The sealed portion 103 of article 102 extending beyond the bottom of the molded article is removed and recycled. The portion 104 of article 102 extending beyond the top of the molded article is sealed around an air injection nozzle 105 through which air is introduced in the blowmolding step. This portion also is removed from the article and recycled. The article shown in this figure has a multilayer wall construction over its entire area, as is shown in FIG. 3A, which represents a magnified view of a small segment of the article wall's cross-section. Those layers, from inside to the outside are: polypropylene (the structural polymer), adhesive resin, ethylene/vinyl alcohol copolymer (barrier resin), adhesive resin, and polypropylene (virgin polymer or recycled polymer or mixture of recycled and virgin polypropylene).

It is, however, not always necessary or even desirable, that the blow-molded article have a multilayer construction over its entire area, as will be explained below.

Figure 4:
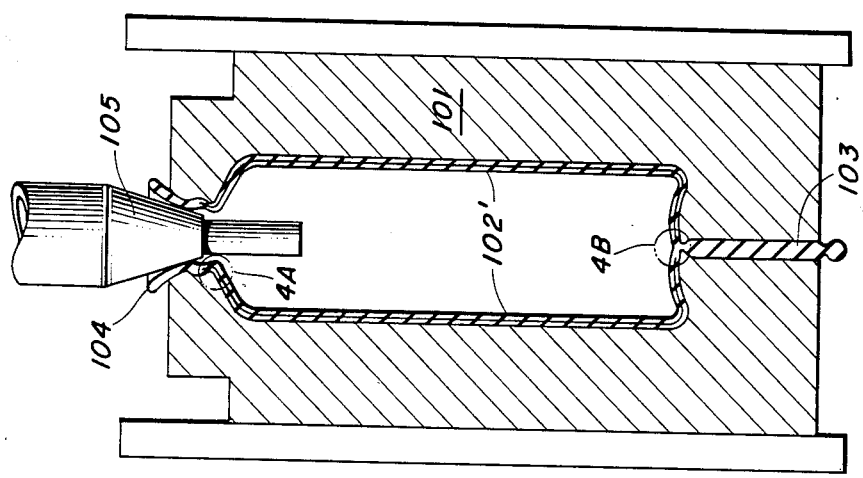
FIG. 4 is a cross-sectional view of another blowmolded article still confined in the mold in which it was formed, and prior to the removal of the end portions of the parison.
Figure 4A:
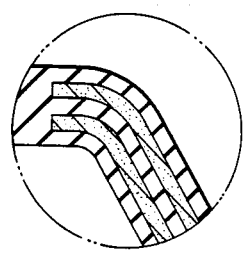
FIG. 4A is a cross-section of a wall of the blowmolded article, showing the individual layers.
Figure 4B:
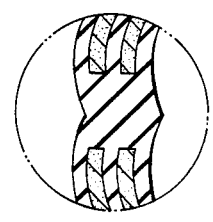
FIG. 4B is a cross-section of the bottom seal area of the blow-molded article, showing both a layered portion and a single-layer portion.

FIG. 4 shows an identical arrangement of a closed mold 101 containing a blowmolded article 102', except that here the article's bottom portion in the seal area within the mold are made of a single layer of the structural polymer, as shown in FIG. 4B, which is a magnified view of the article's bottom wall cross-section in the seal (pinch-off) area. The article's top seal area has a single layer structure in its upper part and a multilayer structure in its lower part, as shown in FIG. 4A. The remainder of the article wall has the same multilayer structure (not shown) as the article in FIG. 3. This variant is advantageous when the article must have a high drop strength. Containers having multiple layers in the bottom seal area often are subject to failure in drop tests. Similarly, a multilayer sealed container top cannot reliably survive certain secondary operations such as, for example, postforming the upper flange to exact tolerances for fabricating a double seamed can. In addition, it is disadvantageous to have the barrier layer extend through the end of the double seam because moisture tends to seep between the layers during the retorting process and then to expand after retorting, causing delamination of the layers. Accordingly, the arrangement of FIG. 4 offers definite advantages in those applications.

FIG. 5 shows the blowmolded article 102 of FIG. 3 with its top and bottom pieces, respectively, 104 and 103, removed. Those pieces 104 and 103 substantially entirely consist of a single layer of the structural polymer, while the article 102 has substantially entirely a multilayer structure.

The injection of additional polymer into the extrusion die 11 must be timed in such a manner that multilayer parison sections of the desired length will be preceded and followed by single layer or two-layer parison sections of a suitable length. This can be accomplished in any manner known to the art, for example, as described in the above-cited U.S. Pat. No. 3,724,985 or in any other way generally known to mechanical and electrical engineers. The timing sequence can be readily calculated from the extrusion rate of the parison and from the rates of addition of the various polymers to the coextrusion head. If necessary, a simple experiment would permit an engineer to establish the proper timing sequence. This operation can be controlled in any known manner, for example, using mechanical controllers, electrical controllers, or a computer.

Under the conditions of the process of the invention, expensive barrier and bonding materials either are not wasted at all or are wasted only to a very minor degree, while at the same time the inexpensive structural polymer is recovered and reused for its primary purpose, providing strength and rigidity to the blowmolded article.

We claim:

1. In a process for coextrusion blow molding of a multi-layer article, wherein molten polymer from at least two sources is fed to a multi-layer extrusion head having at least two polymer inlet ports individually communicating with at least first and second corresponding channels arranged in such a manner that molten polymer flowing along the first channel at some point downstream of the first channel encounters molten polymer flowing along the second channel, thereby forming a flow of two distinct coaxial layers downstream of the second channel, and where more than two coaxial layers ar desired, one or more subsequent channels are arranged downstream of the second channel and molten polymer flows from each subsequent channel into the flow of coaxial layers emanating from a previously encountered channel thereby forming a flow of more than two coaxial layers; a final layered polymer mass being extruded through an opening in a die attached to an exit portion of the extrusion head into a parison; placing an open mold in which the parison is to be blow molded in the path of the parison and beyond the die opening, and continuing the extrusion of the coaxial layers until the parison extends beyond an end of the mold furthest from the extrusion head; closing the mold; sealing both ends of the parison; blowing air into the parison to form the multi-layer article in the mold; cooling the multi-layer article, and removing portions of the parison which extend beyond the mold cavity; and recycling the so removed portions;

the improvement of periodically rapidly injecting into the die attached to the multi-layered coextrusion head additional molten polymer material at timed intervals and at a higher pressure than the pressure at which the coaxial layers of polymer material flow by using a high flow device so as to create a back pressure sufficient to temporarily stop the flow of the coaxial layers of polymer material and to allow this additional polymer material to flow alone out of the die, such that this additional polymer material forms those portions of the parison which will later be removed from the multilayer article and recycled.

2. The process of claim 1 wherein the parison is extruded downwardly, the mold being placed below the opening of the die.

3. The process of claim 1, wherein the additional molten polymer material is a structural polymer.

4. The process of claim 3 wherein the structural polymer is the same as the structural polymer used in at least one layer of the multilayer structure exiting the multilayer coextrusion die head.

5. The process of claim 1, wherein timing of the injection of the additional molten polymer material is such that the multi-layer article resulting from blowmolding has a multilayer wall structure essentially over its entire area.

6. The process of claim 1, wherein the multi-layer article is a container having a top seal and a bottom seal, and timing of the injection of the additional molten polymer material is such that the multi-layered article has substantially multilayer side walls and single layer walls in at least one of a top seal or bottom seal areas of the multi-layer article.

7. The process of claim 1 wherein the structural polymer is polypropylene or polyethylene.

8. The process of claim 7 wherein the side walls of the multi-layer article have a core layer of a barrier polymer.

9. The process of claim 8 wherein the barrier polymer is an ethylene/vinyl alcohol copolymer.

10. The process of claim 8 wherein there is present in the walls of the multi-layer article at least one layer of a bonding material.

11. The process of claim 10 wherein the bonding material is an ethylene/vinyl acetate copolymer or a composition containing both an ethylene/vinyl acetate copolymer and polyethylene or a polypropylene composition containing a maleic anhydride component.

* * * * *